United States Patent

[11] 3,614,633

[72] Inventors Aly Umyarovich Yalyshev;
David Veniaminovich Svecharnik; Vladimir Alexandrovich Pavlenko; Vyacheslav Alexeevich Tsarkov; Bonch-Bruevick Andrei Mikhailovich; Boris Alexandrovich Levinson, all of Moscow, U.S.S.R.
[21] Appl. No. 741,978
[22] Filed July 2, 1968
[45] Patented Oct. 19, 1971
[73] Assignee Gosudarstvenny Nauchno-issledovatelsky institut teploenergeticheskogo priborostroenia Moscow, U.S.S.R.

[54] INDUSTRIAL PROCESS REGULATOR OF PROPORTIONAL PLUS INTEGRAL PLUS DIFFERENTIAL ACTION
2 Claims, 3 Drawing Figs.
[52] U.S. Cl. ..................................... 328/127,
318/610, 318/621, 330/107, 330/108
[51] Int. Cl. ..................................... G06g 7/18
[50] Field of Search ........................... 330/108,
107, 109; 328/127, 128; 307/230; 235/150.51,
150.53, 183; 318/20.390, 20.395, 20.745, 20.750,
20.821

[56] References Cited
UNITED STATES PATENTS
3,377,548 4/1968 Newbold ............... 318/20.395 X
3,479,492 11/1969 Hornfeck et al. ............ 235/183 X

*Primary Examiner*—Roy Lake
*Assistant Examiner*—James B. Mullins
*Attorney*—Waters, Roditi, Schwartz & Nissen ABSTRACT: A regulator for industrial process control, including an amplifier and a negative feedback circuit. The regulator is of a proportional, plus integral, plus differential action type which includes RC components in the feedback group. The feedback group includes a plurality of resistors and capacitors having ganged slider arms and adjustment controls for maintaining a high accuracy over a wide range of parameters for the regulator. An input scaling device is provided including a voltage divider network and a potentiometer with the potentiometer connected through the feedback loop or circuit to an input of the amplifier. One input and an output of the amplifier are connected together to serve as a common bus point.

INDUSTRIAL PROCESS REGULATOR OF PROPORTIONAL PLUS INTEGRAL PLUS DIFFERENTIAL ACTION

The invention relates to regulators of proportional plus integral plus differential action and can be sued in the systems of automatic control and regulation.

A conventional regulator with proportional plus integral plus differential action used in industrial process control comprises an amplifier with an RC-component negative feedback loop and an input signal scaling device connected with the amplifier and the feedback RC loop and having a potentiometer and a resistor.

A disadvantage of the conventional regulators is its limited range of independent adjustment of the $T_d/T_i$ parameter representing the magnitude of the ratio of the differentiation time constant $T_d$ to the integration time constant $T_i$. Owing to imperfection of the design used in that regulator it is not feasible to attain smooth setting of the $T_d/T_i$ parameter of zero position, i.e. the regulator does not allow a smooth transition from the proportional plus integral (PI) mode to the proportional plus integral plus differential (PID) mode of control and vice versa.

At the same time, when high levels and substantial jumps of the input signal prevail involving unwanted (parasitic) components, mainly high-frequency noise, a conventional regulator circuit incurs the nonlinear overloaded condition of amplifier performance due to the fact that the regulator circuit does not provide for filtering (damping) action with independent and wide-range adjustment of its time constant $\tau_f$.

It is an object of the present invention to provide a regulation of proportional plus integral plus differential action with much wider possibilities of function realized through smooth adjustment of the $T_d/T_i$ parameter from zero to a preset maximum and through improvement of the regulator filtering properties in a wide range of the integral component variation.

With this and other objects in view, the invention resides essentially in the application of a proportional plus integral plus differential action regulator for industrial process control which comprises an amplifier with negative feedback realized through RC components and a device for input signal scaling connected with the amplifier and feedback RC components and incorporating a resistor and a potentiometer, wherein, according to the invention, the input signal scaling device is provided with a second resistor, its potentiometer is connected across the regulator input, and the resistors form a divider placed in parallel with the potentiometer, the common point of the divider's resistors being connected to an adjustable resistor in the feedback loop, connected to the amplifier summation point, the second input point of the amplifier which is the counterpart of the summation point being connected with the amplifier output and the regulator input.

It is expedient to provide the negative feedback loop with a feedback-signal scaler connected to an additional variable capacitor connected with the feedback RC components, and in doing so to ensure that a means for adjusting the additional capacitor and those of the feedback capacitors be rigidly intercoupled mechanically so that the ratio of each feedback capacitor to the said additional capacitor could be kept constant throughout the range of variation of the regulator adjustable parameters.

A third resistor can be inserted between the amplifier input point opposite to the summation point and the regulator input, then, with a fourth resistor inserted between the first two, all the resistors and potentiometer can be connected so as to form a bridge circuit with the potentiometer slider connected to the common point of the second and fourth resistors and to the variable feedback capacitor connected to the amplifier summation point, and the adjustable feedback resistor can be connected to the common point of the first and fourth resistors.

It is possible to insert between the potentiometer and the third resistor a fifth resistor having its common point with the third resistor connected to the amplifier output.

Given below is a detailed description of exemplary embodiments of the present invention with reference to the appended drawings.

Figure 1:
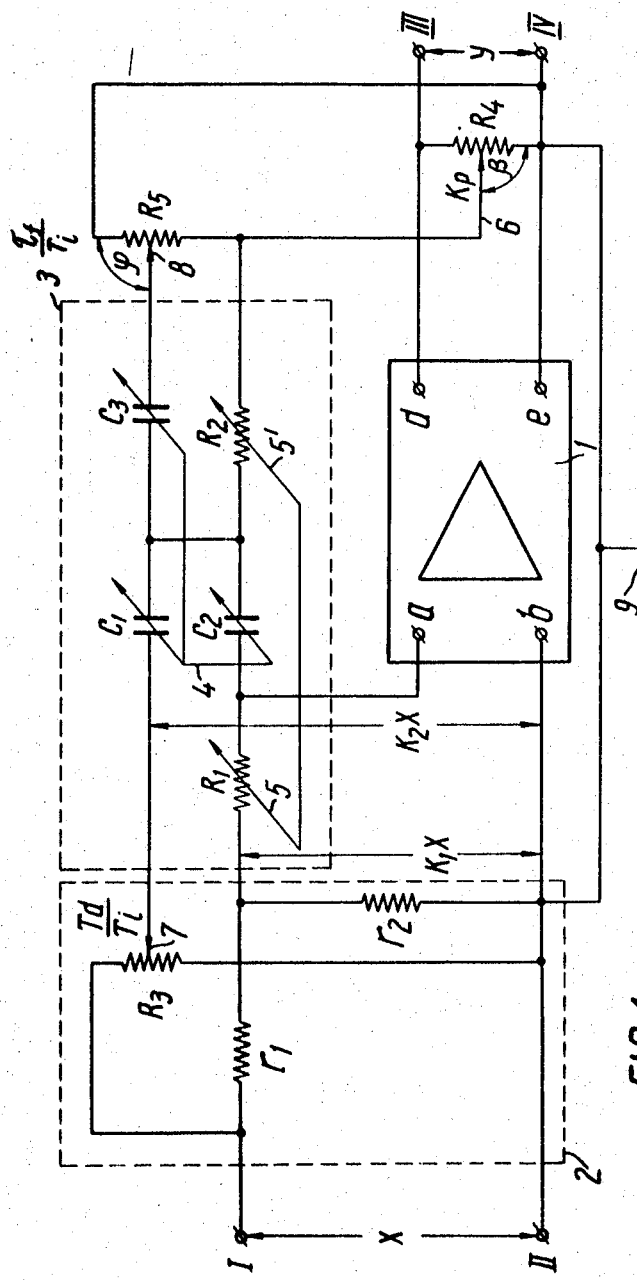
FIG. 1 is a schematic diagram of an embodiment of the present invention.

A regulator of proportional plus integral plus differential action (FIG. 1) comprises an amplifier 1 with sufficiently high amplification factor, a device 2 for scaling the input signal X incorporating low resistance, as compared with the adjustable feedback resistors $R_1$ and $R_2$ 23, resistors $r_1$ and $r_2$ and a low-resistance potentiometer $R_3$.

The amplifier 1 has a dynamic negative feedback loop 3 incorporating resistors $R_1$, $R_2$ and capacitors $C_1$, $C_2$, $C_3$, with adjustment means 4 of all these three capacitors and sliders 5, 5¹, of the both adjustable feedback resistors $R_1$ and $R_2$ rigidly interconnected.

The output of the amplifier 1 is connected to the potentiometer $R_4$ which serves for changing the height of the feedback signal and controlling a proportionally coefficient $K_p$.

Between slider 6 of potentiometer $R_4$ and the output point "e" of amplifier I, a third potentiometer $R_5$ is connected, which serves for setting the desired value of the time constant $\tau_f$ of the filter circuit.

Slider 7 of potentiometer $R_3$ is immediately connected to the differentiating capacitor $C_1$ whereas the slider 8 of potentiometer $R_5$ is connected to the capacitor $C_3$, the opposite terminals of capacitors $C_1$ and $C_3$ being interconnected and joined to one of the terminals of the resistor $R_2$ and differentiating capacitor $C_2$. The other terminal of the capacitor $C_2$ in connected to the summation point "a" of the amplifier I to which point is also connected the resistor $R_1$. The slider 6 of potentiometer $R_4$ has a common contact point both with the potentiometer $R_5$ and with the resistor $R_2$. In their turn the regulator input point II and its point IV together with the input "b" and output "e" points of the amplifier are immediately interconnected forming one node (bus) 9.

The regulator represented in FIG. 1 serves to practically realize the regulating action with the transfer function as follows:

$$W(S) = \frac{y(S)}{X(S)} = -K_p\left(1 + \lambda T_i S + \frac{1}{T_i S}\right) \cdot \frac{1}{(1+\alpha T_i S)},$$

where
$S$ is the Laplace differential operator;
$X(S), Y(S)$ = regulator input and output signals, respectively;
$K_p, K_p$ = proportionally coefficient; $\lambda$ $\alpha$
$T_i$ = integration time constant;
$\lambda = T_d/T_i$ = coefficient, characteristic of the ratio of the differential time constant ($T_d$) to the integration time constant ($T_i$).
$\alpha = T_f/T_i$ = coefficient, characteristic of the efficiency of introducing the time constant ($\tau_f$) of the filter circuit for a specified integration time constant setting.

In the ideal case, i.e., when the resistance ratings of the input signal X scaling device 2 and potentiometers $R_4$, $R_5$ are chosen to be much smaller than the resistor values of $R_1$ and $R_2$ of the feedback loop and the amplification factor of amplifier I is sufficiently large, the regulator transfer function (FIG. I) can be written as follows $$\frac{y(S)}{X(S)} = -\frac{1}{\beta} \cdot \frac{1}{(1+\varphi R_2 C_3 S)} \cdot \left[K_1\left(1+\frac{C_1+C_3}{C_2}\right)\frac{R_2}{R_1}\right] \cdot \left\{1 + \frac{K_2 R_2 C_1}{\left[K_1\left(1+\frac{C_1 C_3}{C_2}\right)\cdot\frac{R_2}{R_1}\right]} \cdot S + \frac{1}{\frac{1}{K_1}\left[K_1\left(1+\frac{C_1+C_3}{C_2}\right)\frac{R_2}{R_1}\right]R_1 C_2 S}\right\},$$

where
$\Phi$ and $\beta$ are rotation angles of the potentiometers $R_5$ and $R_4$, respectively;
$K_1$ = steepness of input signal fed to the resistor $R_i$;

$K_2$=steepness of input signal fed to the capacitor $C_1$.

By virtue of the fact that $C_1/C_2=\eta$ =const, $C_3/C_2=\mu$ =const, $R_2/R_1=M$=const, and $K_1$=const, we have $$\left[K_1\left(1+\frac{C_1+C_3}{C_2}\right)\frac{R_2}{R_1}\right]=\text{const}; \quad T_i=R_2(C_1+C_2+C_3);$$

$$T\alpha=\frac{R_2C_1}{\left[K_1\left(1+\frac{C_1+C_3}{C_2}\right)\frac{R_2}{R_1}\right]}\cdot K_2;$$

$$\lambda=\frac{T_d}{T_i}=\frac{R_2C_1}{R_1C_2}\cdot\frac{1}{\left[K_1\left(1+\frac{C_1+C_3}{C_2}\right)\frac{R_2}{R_1}\right]^2}\cdot K_1$$

$$=m\cdot\eta\frac{1}{[K_1(1+\eta+\mu)m]^2}\cdot K=\text{const}.\,K_2.$$

The range of variation of the coefficient $K_2$ is
$$0\leq K_2\leq 1.$$

Thus, the regulator effects independent adjustment of the $T_d/T_i$ parameter, with a smooth transition from the PI action to the PID action and vice versa becoming feasible.

The time constant of the feedback filter circuit is $$\tau_f=\varphi\cdot R_2C_3=\varphi\cdot T_i\frac{1}{\left(1+\frac{C_1}{C_3}+\frac{C_2}{C_3}\right)}=\varphi\cdot T_i=\frac{1}{\left(1+\frac{\eta}{\mu}+\frac{1}{\mu}\right)}$$

$$=\varphi\cdot T_i\cdot\text{const}.$$

Therefore:
$$\alpha=\tau_f/T_i=\text{const}.\,\Phi\text{ with }0\leq\varphi\leq 1.$$

The regulation function is affected by the filter circuit throughout wide range of settings of the integration time constant, which is realized by the potentiometer $R_5$.

Owing to independent setting of the parameters $\lambda$ and $\alpha$ the regulator is provided with the possibility of a wide-range control of the ratio of the differentiation time constant to the filter circuit time constant, i.e. the magnitude of the ratio $T_d/T_f=\lambda/\alpha$.

A considerable advantage of this regulator over a conventional one consists in the fact that in the former the input and output terminals of the amplifier I and the regulator have a common point (bus) 9. This factor facilitates coupling of the regulator with computers and simulators.

Figure 2:
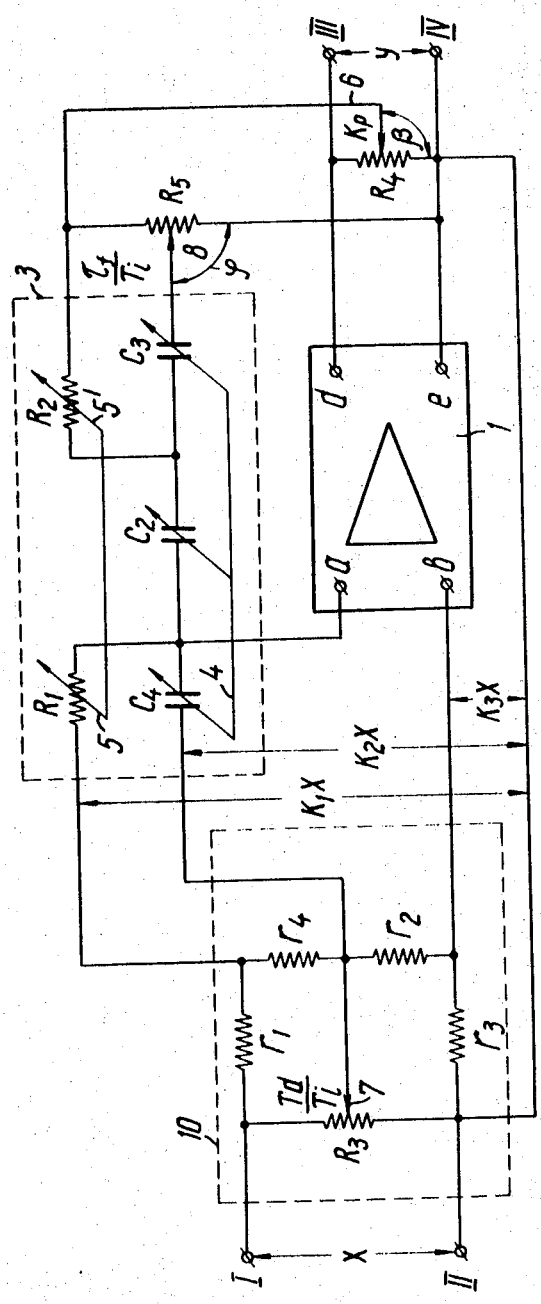
FIG. 2 is a schematic diagram of another embodiment of the present invention.

A modification of the regulator in which the differentiating capacitor $C_4$ is joined immediately to the input (point "$a$") of the amplifier I is shown in FIG. 2. Therewithal, a third resistor $r_3$ is placed between the input point "$38$" of amplifier I opposite to the summation point "$a$" and the regulator input II, whereas a fourth resistor $r_4$ is inserted between the first $r_1$ and the second $r_2$ resistors. Thus all the resistors ($r_1, r_2, r_3, r_4$) and potentiometer $R_3$ form a low-resistance bridge circuit 10 in which the slider 7 of potentiometer $R_3$ is joined to the common point of the second $r_2$ and fourth $r_4$ resistors and to the variable capacitor $C_4$ of feedback loop 3, the capacitor $C_4$ being connected with the summation point "$a$" of amplifier I and the adjustable feedback resistor $R_1$ joined to the common point of the first $r_1$ and fourth $r_4$ resistors.

The bridge circuit 10 used in the regulator modification of FIG. 2 as a scaling device for the input signal X ensures rigid functional relation between the portions $K_1X$, $K_2X$ and $K_3X$ of the input signal X, which are obtained at the measurement points of the bridge circuit 10.

The input point "$b$" of amplifier I receives an input signal having a steepness of $K_3$.

As the resistance ratings of $r_1; r_2; r_3; r_4; R_3; R_4; R_5$ are much lower than the resistance values of $R_1$ and $R_2$ in the feedback loop and the amplification factor of the amplifier I is sufficiently large, the transfer function of the regulator (FIG. 2) can be expressed as follows:

$$W(S)=\frac{y(S)}{X(S)}=-\frac{1}{\beta}\cdot\frac{1}{(1+\varphi R_2C_3S)}\cdot\left[(K_1-K_3)\left(1+\frac{C_3}{C_2}\right)\frac{R_2}{R_1}\right.$$

$$\left.+(K_1-K_3)\frac{C_4}{C_2}-K_3\right]\cdot\Bigg\{1$$

$$-\frac{\left[(K_2-K_3)\left(1+\frac{C_3}{C_2}\right)C_4-K_3C_3\right]R_2}{\left[(K_1-K_3)\left(1+\frac{C_3}{C_2}\right)\frac{R_2}{R_1}+(K_2-K_3)\frac{C_4}{C_3}-K_3\right]}\cdot S$$

$$+\frac{(K_1-K_3)}{\left[(K_1-K_3)\left(1+\frac{C_3}{C_2}\right)\frac{R_3}{R_1}+(K_2-K_3)\frac{C_4}{C_2}-K_3\right]R_1C_2}\cdot\frac{1}{S}\Bigg\}.$$

Since the ratio of the like impedances are constant, i.e. $C_4/C_2=\eta$ =const; $C_3/C_2=\lambda$ =const; $R_2/R_1=m$=const, the bridge circuit functionally ensures that the value of component $$\left[(K_1-K_3)\left(1+\frac{C_3}{C_2}\right)\frac{R_2}{R_1}+(K_2-K_3)\frac{C_4}{C_2}-K_3\right]=\text{const}.$$

is kept constant.

If, actually, $C_4=C_2=C_3=C$ and $R_1=R_2=R$ whereas $K_3=0.5K_2$, $K_1=0.5(K_2+1)$ which is achieved by using the same resistance ratings of $r_1; r_2; r_3; r_4$; then $$\left[(K_1-K_3)\left(1+\frac{C_3}{C_2}\right)\frac{R_2}{R_1}+(K_2-K_3)\frac{C_4}{C_2}-K_3\right]=1.$$

Consequently, under this initial condition, we have $$\frac{y(S)}{X(S)}=-\frac{1}{\beta}\cdot\frac{1}{(1+\varphi\cdot RCS)}\left(1+0.5K_2RCS-\frac{1}{2RCS}\right).$$

So this regulator realizes independent adjustment of proportionally coefficient through variation of the height of feedback signal equal to $\beta$ as well as independent adjustment of the following parameters: the integration time constant $T_i$ (by means of resistors $R_1$; $R_2$ and feedback capacitors $C_4$, $C_3$, $C_2$), the $T_d$-$T_i$ parameter as it equals $0.5K_2$ and the $\tau_f/T_i$ parameter equal to $0.5\Phi$.

Figure 3:
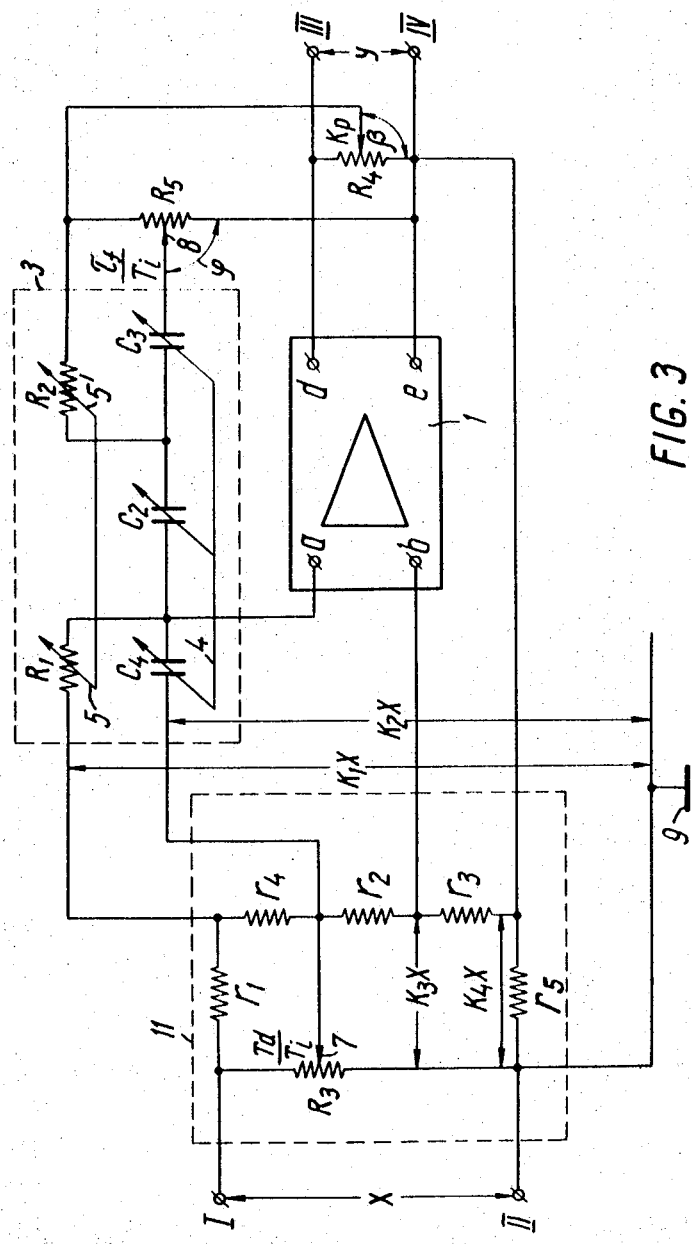
FIG. 3 is a schematic diagram of yet another embodiment of the present invention.

FIG. 3 shows another modification of the regulator circuit, according to the invention, employing a bridge circuit II. This regulator modification differs from the previous one in that there is a fifth resistor $r_5$ inserted between the potentiometer $R_3$ and the third resistor $r_3$ in the bridge circuit II, and its common point with the third resistor $r_3$ is connected to the amplifier output (point "$e$"). Together with this the output point "$e$" of the amplifier is fed with a portion of input signal X with a steepness $K_4$ taken from the bridge circuit II.

The transfer function of the regulation action realized in this modification with the above stated premises will be expressed as follows:

$$\frac{y(S)}{X(S)}=-\frac{1}{\beta}\cdot\frac{1}{(1+\varphi R_2C_3S)}\left[(K_1-K_3)\left(1-\frac{C_3}{C_2}\right)\frac{R_2}{R_1}+(K_2-K_3)\frac{C_4}{C_2}\right.$$

$$\left.+(K_4-K_3)\right]\cdot\Bigg\{1$$

$$+\frac{\left[(K_2-K_3)\left(1+\frac{C_3}{C_2}\right)C_4+(K_4-K_3)C_3\right]R_2}{\left[(K_1-K_3)\left(1+\frac{C_3}{C_2}\right)\frac{R_2}{R_1}+(K_2-K_3)\frac{C_4}{C_2}+(K_4-K_3)\right]}\cdot S$$

$$+\frac{1}{\frac{1}{(K_1-K_3)}\cdot\left[(K_1-K_3)\left(1+\frac{C_3}{C_2}\right)\frac{R_2}{R_1}+(K_2-K_3)\frac{C_4}{C_2}+(K_4-K_3)\right]R_1C_2}\cdot\frac{1}{S}\Bigg\}.$$

The bridge circuit II in this modification ensures keeping constant the following component:

$$\left[(K_1-K_3)\left(1-\frac{C_3}{C_2}\right)\frac{R_2}{R_1}+(K_2-K_3)\frac{C_4}{C_2}+(K_4-K_3)\right]=\text{const}$$

The regulator circuit embodiments considered here allow application of other types of converters (e.g., a magnetic amplifier) in place of the potentiometers $R_4$ and $R_5$.

Although this invention is described in connection with a preferred form of its realization, there can be alterations and modifications incurring no deviation from the idea and scope of the present invention, which will be obvious to those competent in the art.

Those modifications and alterations are considered as not going beyond the matter and scope of this invention as set forth in the appended claims.

What is claimed is:

1. A regulator for industrial process control of proportional plus integral plus differential action comprising an amplifier having an output across first and second output terminals and first and second input points, said first input point forming a summation point, said second input point being coupled to said second output terminal of said amplifier, a negative feedback loop, said negative feedback loop including adjustable resistor means and adjustable capacitor means, said feedback loop being coupled between the first and second output terminals and said first and second input points, said adjustable capacitor means having an end connected to said summation point and including a plurality of capacitors with each of said plurality of capacitors provided with respective adjustment means, said respective adjustment means, of said capacitors being intercoupled, and an input scaler being coupled to said amplifier, said input scaler including a potentiometer having first and second ends, a first and a second resistor, said first and second resistors being connected together at a common point, including a third and a fourth resistor, said third and fourth resistor forming a bridge circuit with said first and second resistors, said third resistor being coupled between said second resistor and said second end of said potentiometer, said fourth resistor being connected between said first resistor and said first end of said potentiometer, said potentiometer including a slider being connected to said common point and to one of said plurality of capacitors, said one of said plurality of capacitors being connected to said summation point, said adjustable resistor means being connected to the connection between said first and fourth resistors.

2. A regulator as claimed in claim 1, including a fifth resistor, connected between said second end of said potentiometer and said third resistor.